(12) United States Patent
Kirla et al.

(10) Patent No.: US 9,812,144 B2
(45) Date of Patent: Nov. 7, 2017

(54) SPEECH TRANSCODING IN PACKET NETWORKS

(71) Applicant: NOKIA SOLUTIONS AND NETWORKS OY, Espoo (FI)

(72) Inventors: Olli Sakari Kirla, Espoo (FI); Antti Pekka Einari Kurittu, Vantaa (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 214 days.

(21) Appl. No.: 14/786,779

(22) PCT Filed: Apr. 25, 2013

(86) PCT No.: PCT/EP2013/058573
§ 371 (c)(1),
(2) Date: Oct. 23, 2015

(87) PCT Pub. No.: WO2014/173446
PCT Pub. Date: Oct. 30, 2014

(65) Prior Publication Data
US 2016/0078876 A1    Mar. 17, 2016

(51) Int. Cl.
*G10L 19/005* (2013.01)
*G10L 19/012* (2013.01)
(Continued)

(52) U.S. Cl.
CPC .......... *G10L 19/173* (2013.01); *G10L 19/012* (2013.01); *G10L 19/167* (2013.01);
(Continued)

(58) Field of Classification Search
CPC .... G10L 19/005; G10L 19/012; G10L 19/173
See application file for complete search history.

(56) References Cited

U.S. PATENT DOCUMENTS 6,324,503 B1 * 11/2001 Manjunath ............ G10L 19/005
704/200
6,615,169 B1 * 9/2003 Ojala .................... G10L 19/012
704/205
(Continued)

FOREIGN PATENT DOCUMENTS

GB      2 306 861 A    5/1997

OTHER PUBLICATIONS

International Search Report and Written Opinion dated Jan. 14, 2014 corresponding to International Patent Application No. PCT/EP2013/058573.
(Continued)

*Primary Examiner* — Eric Yen
(74) *Attorney, Agent, or Firm* — Squire Patton Boggs (US) LLP

(57) ABSTRACT

Speech transcoding in packet networks may be useful when both incoming and outgoing speech streams of the transcoding entity are packet based. This can be any transcoding entity having packet interfaces. A method can include omitting jitter buffering before decoding in a transcoder and omitting bad frame handling in a decoding stage of a transcoder. The method can also include freezing a decoder and the encoder when a packet is not received. The method can also include sending packet loss information from the decoder to the encoder as side information when the packet is not received. The method can further include setting an outgoing packet stream to permit detection of missing packets by a downstream decoder upon receiving a valid packet after the packet is not received.

20 Claims, 12 Drawing Sheets

(51) Int. Cl.
*G10L 19/16* (2013.01)
*H04L 12/841* (2013.01)
*H04L 12/825* (2013.01)
*H04W 88/18* (2009.01)

(52) U.S. Cl.
CPC ............ *H04L 47/26* (2013.01); *H04L 47/283* (2013.01); *G10L 19/005* (2013.01); *H04W 88/181* (2013.01)

(56) References Cited

U.S. PATENT DOCUMENTS

| | | | | |
|---|---|---|---|---|
| 6,772,112 B1* | 8/2004 | Ejzak | ................... | G10L 19/167 704/201 |
| 6,782,361 B1* | 8/2004 | El-Maleh | ............. | G10L 19/012 704/223 |
| 7,434,117 B1* | 10/2008 | Chung | ................. | G10L 19/005 704/219 |
| 2002/0013696 A1* | 1/2002 | Hama | .................. | G10L 19/005 704/220 |
| 2003/0065508 A1* | 4/2003 | Tsuchinaga | .......... | G10L 19/012 704/215 |
| 2005/0177364 A1* | 8/2005 | Jelinek | ................... | G10L 19/24 704/214 |
| 2006/0178872 A1* | 8/2006 | Sung | .................... | G10L 19/005 704/205 |
| 2009/0180531 A1* | 7/2009 | Wein | ...................... | G10L 19/08 375/240 |
| 2009/0268755 A1* | 10/2009 | Inoishi | .................. | H04L 65/103 370/466 |
| 2010/0284281 A1 | 11/2010 | Sperschneider | | |
| 2013/0077632 A1 | 3/2013 | Ishiguro et al. | | |

OTHER PUBLICATIONS

ETSI TS 126 114 V10.6.0 (Apr. 2013), Technical Specification, "Universal Mobile Telecommunications System (UMTS); LTE; IP Multimedia Subsystem (IMS); Multimedia telephony; Media handling and interaction (3GPP TS 26.114 version 10.6.0 Release 10)", Apr. 1, 2013, XP014156501, 272 pages.

3GPP TS 26.092 V11.0.0 (Sep. 2012), Technical Specification, 3rd Generation Partnership Project; Technical Specification Group Services and System Aspects; Mandatory speech codec speech processing functions; Adaptive Multi-Rate (AMR) speech codec; Comfort noise aspects (Release 11), Sep. 21, 2012, XP050686378, 12 pages.

Bo Wei et al., "Voice Transmission Over All-IP Tandem Links," Asilomar Conference on Signals, Systems and Computers; IEEE 2003, pp. 275-279; XP010701874.

* cited by examiner

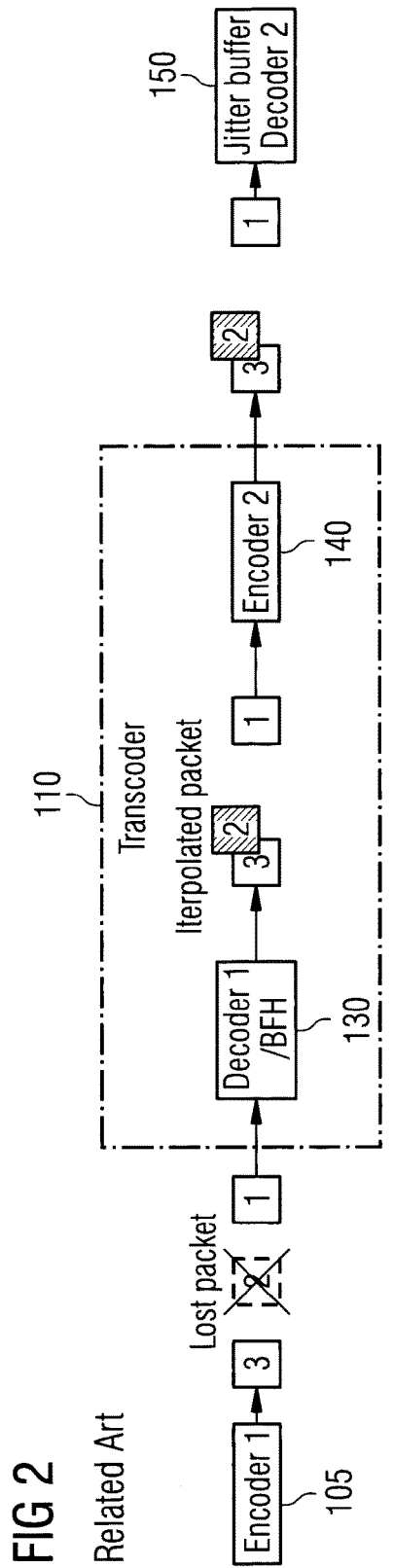

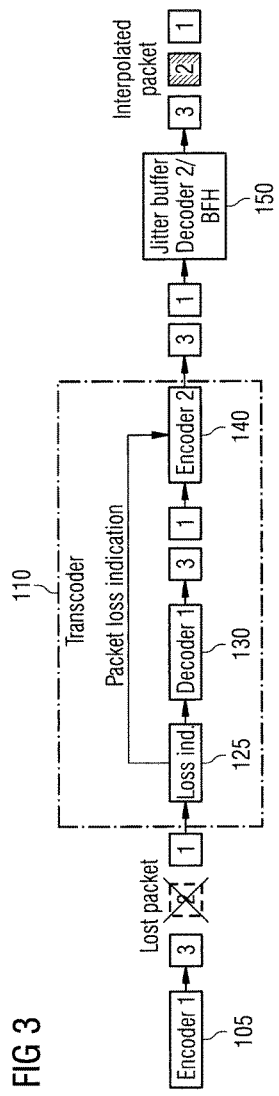

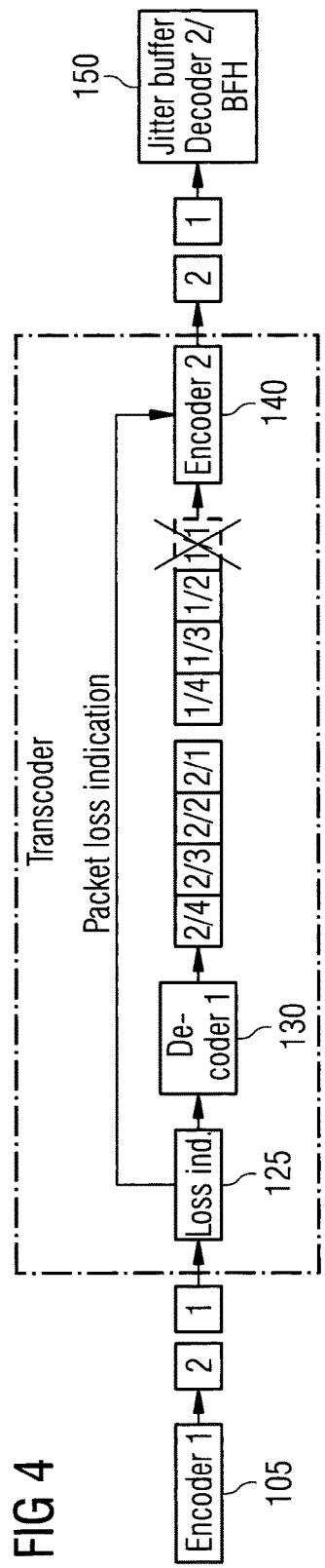

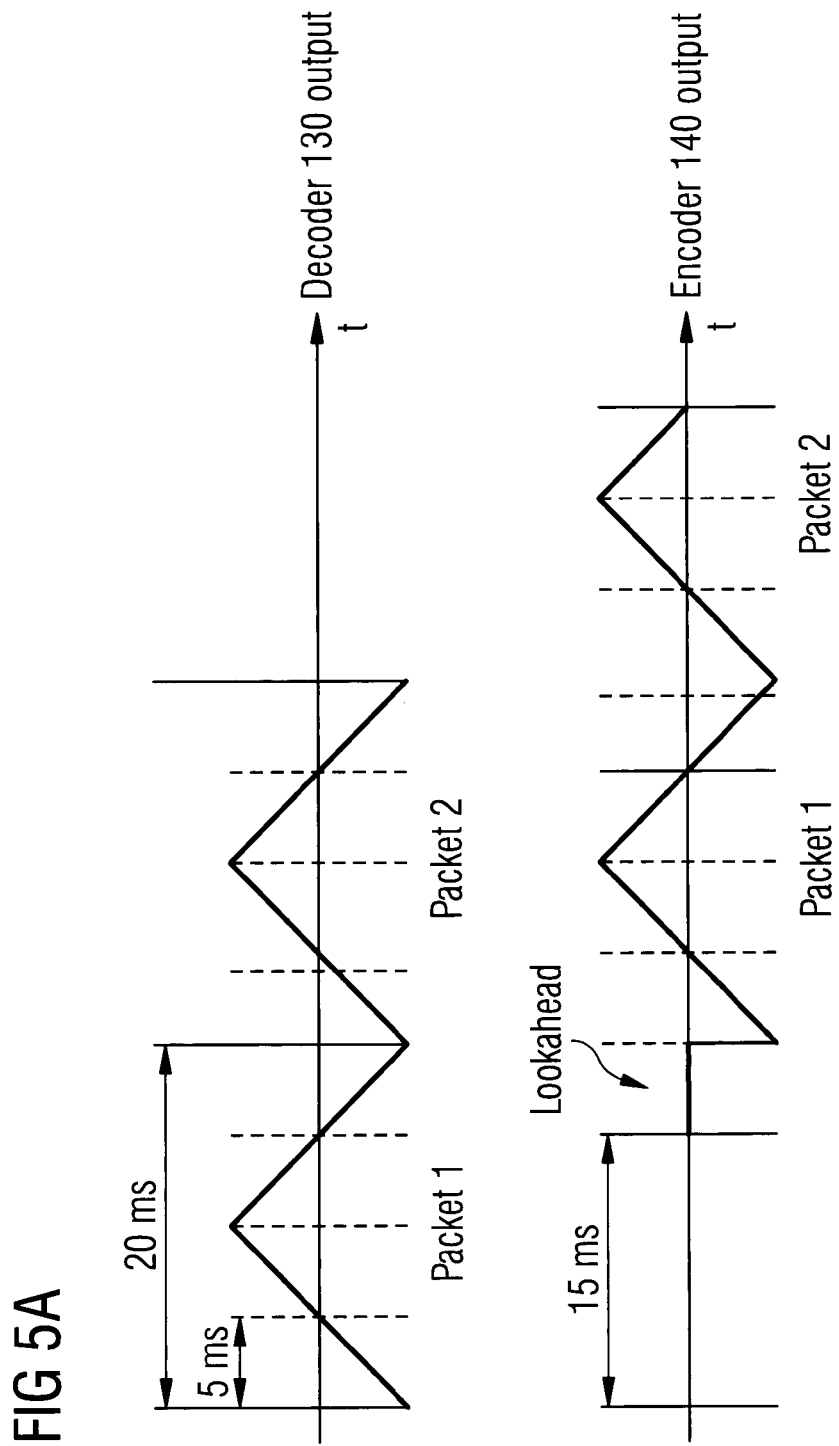

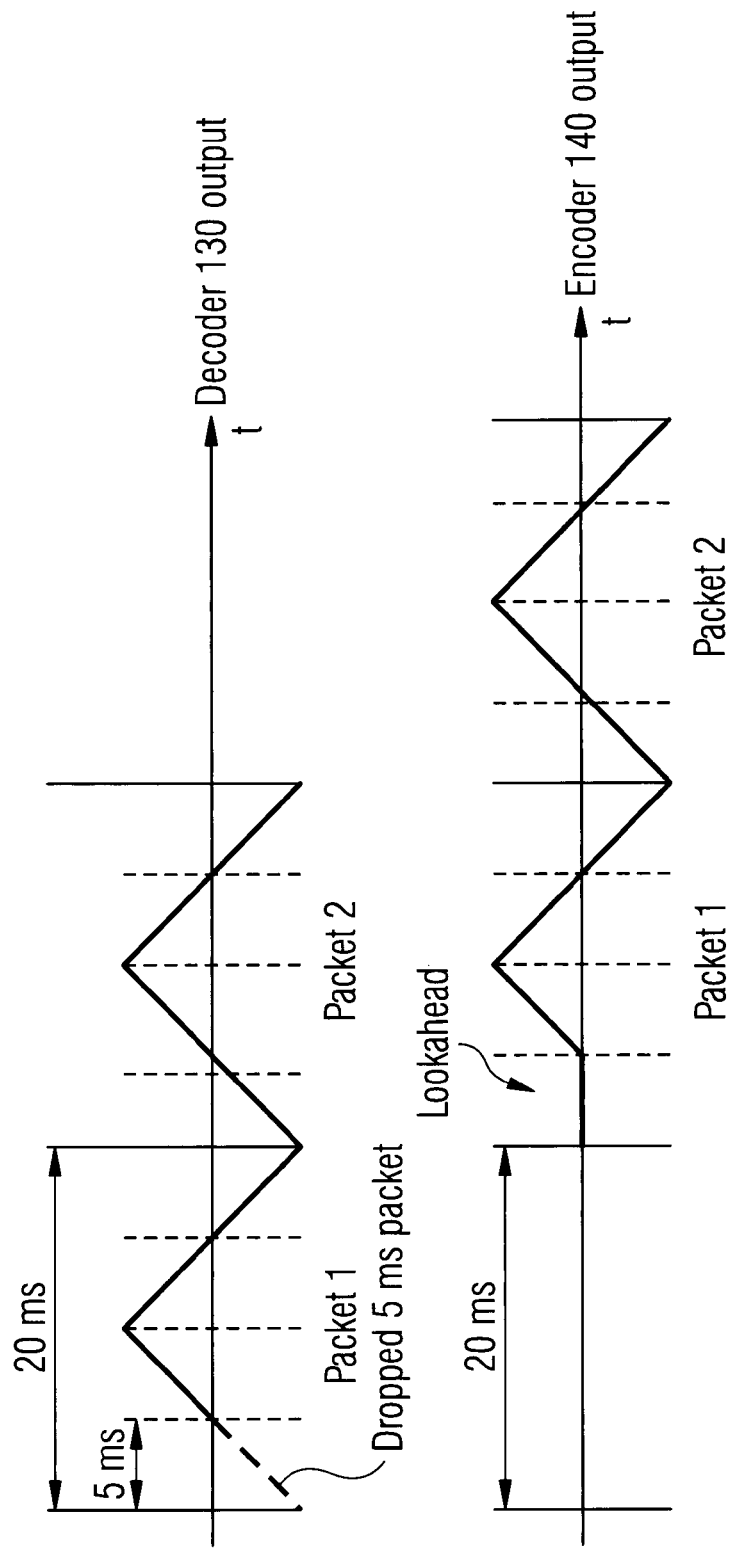

SPEECH TRANSCODING IN PACKET NETWORKS

BACKGROUND

Field

Speech transcoding in packet networks may be useful when both incoming and outgoing speech streams of the transcoding entity are packet based. This can be any transcoding entity having packet interfaces, such as, but not limited to A-interface over IP (AoIP) in global system for mobile communication (GSM), Iu in third generation (3G), Mb in voice over internet protocol (VoIP) or long term evolution (LTE), multimedia resource function (MRF) entity in the internet protocol (IP) cloud, or the like.

Description of the Related Art

Conventionally, jitter buffering used before transcoding is also used for IP-to-IP connections, like IP-to-circuit switched (CS) connections. The term de-jitter buffering can also refer to the same thing as the term jitter buffering. FIG. 1 illustrates transcoding with jitter buffering. This approach may be used, for example, in a Media Gateway (MGW). However, this approach may result in increased latency of the connection.

As shown in FIG. 1, Encoder1 105 may send packets 1, 2, and 3, but packet 2 may be lost. A transcoder 110 may use a jitter buffer 120 and first decoder/bad frame handler (BFH) 130. The jitter buffer 120 may forward the packets and a packet loss indication to the first decoder/BFH 130. The decoder1 130 can use bad frame handling to conceal the lost packet. Packet loss concealment is a synonym for bad frame handling. The transcoder 110 may interpolate packet 2 via bad frame handling in decoder1 130 and encode the packets using Second encoder 140. The packets can then be sent to and received by jitter buffer second decoder 150.

Another possible solution is the scheduling of transcoding immediately when a packet has been received. This is shown in FIG. 2. In this solution, the running of transcoding stage is based on received packet time instant, rather than timer based instant. Handling lost and out of order packets may not be easy in this case. If one or more packets are lost, the transcoding stage must be run multiple times at the same time when the next valid speech packet is received. One reason is that the bad frame handler, or packet loss concealment, of the decoder 130 interpolates missing packets before second encoder 140, which is the encoder of the transcoding stage. This will generate a huge peak in the processing load of the transcoding stage. Increased jitter may also exist in the outgoing packet stream when encoded interpolated and the next valid received packets are clustered.

In the case of out-of-order packet, the out-of-order packet will be discarded as the latter packet has already been processed by the transcoding stage. On the other hand if jitter buffer is applied, the order of packets can be rearranged before the transcoding, and no packets will be lost.

SUMMARY

According to certain embodiments, a method includes receiving a packet at a packet loss detector of a transcoder and omitting jitter buffering before decoding in the transcoder and omitting bad frame handling in a decoding stage of the transcoder. A decoder of the transcoder decodes the packet into a decoded packet, and the decoded packet is encoded into a re-encoded packet by an encoder of the transcoder. The method also includes transmitting the re-encoded packet from the transcoder. Further, the method includes monitoring for a received packet. When a packet is not received, the method additionally includes freezing the decoder and the encoder. The method also includes sending packet loss information from the decoder to the encoder as side information when the packet is not received. In addition, the method includes setting an outgoing packet stream to permit detection of missing packets by a downstream decoder upon receiving a valid packet after the packet is not received.

In certain embodiments, an apparatus includes a packet loss detector configured to receive a packet at a packet loss detector. The apparatus is configured to omit jitter buffering before decoding and to omit bad frame handling in a decoding stage. The apparatus also includes a decoder configured to decode the packet into a decoded packet, and an encoder configured to encode the decoded packet into a re-encoded packet. The apparatus additionally includes a transmitter configured to transmit the re-encoded packet from the transcoder. The packet loss detector is further configured to monitor for a received packet and to freeze the decoder and the encoder when a packet is not received. The decoder is configured to send packet loss information to the encoder as side information when the packet is not received. The encoder is configured to set an outgoing packet stream to permit detection of missing packets by a downstream decoder upon receiving a valid packet after the packet is not received.

An apparatus, according to certain embodiments, includes receiving means for receiving a packet. The apparatus is configured to omit jitter buffering before decoding and to omit bad frame handling in a decoding stage. The apparatus further includes decoding means for decoding the packet into a decoded packet and encoding means for encoding the decoded packet into a re-encoded packet. The apparatus also includes transmitting means for transmitting the re-encoded packet. Further, the apparatus includes monitoring means for monitoring for a received packet. The apparatus additionally includes freezing means for freezing the decoder and the encoder when a packet is not received, and sending means for sending packet loss information from the decoder to the encoder as side information when the packet is not received. The apparatus further includes setting means for setting an outgoing packet stream to permit detection of missing packets by a downstream decoder upon receiving a valid packet after the packet is not received.

A non-transitory computer readable medium, in certain embodiments, is encoded with instructions that, when executed in hardware, performs a process. The process includes receiving a packet at a packet loss detector of a transcoder. In addition, the process includes omitting jitter buffering before decoding in the transcoder and omitting bad frame handling in a decoding stage of the transcoder. Further, the process includes decoding the packet into a decoded packet by a decoder of the transcoder and encoding the decoded packet into a re-encoded packet by an encoder of the transcoder. The process also includes transmitting the re-encoded packet from the transcoder. Further, the process includes monitoring for a received packet and freezing the decoder and the encoder when a packet is not received. The process also includes sending packet loss information from the decoder to the encoder as side information when the packet is not received. In addition, the process includes setting an outgoing packet stream to permit detection of missing packets by a downstream decoder upon receiving a valid packet after the packet is not received.

BRIEF DESCRIPTION OF THE DRAWINGS

For proper understanding of the invention, reference should be made to the accompanying drawings, wherein:

FIG. 2 illustrates a conventional transcoding without jitter buffering.

FIG. 3 illustrates a first embodiment providing transcoding without jitter buffering and bad frame handling.

FIG. 4 illustrates a second embodiment providing enhancement for lookahead in a second encoder.

FIG. 5a illustrates signal waveform without lookahead alignment.

FIG. 5b illustrates signal waveform for the second embodiment.

DETAILED DESCRIPTION

Certain embodiments may avoid the latency issues found in conventional approaches by, for example, omitting the jitter buffering before the transcoding stage. Furthermore certain embodiments can avoid a peak processing load problem and packet clustering in the outgoing stream for received lost packets by freezing decoder and encoder running for the time period when packets are not received. As soon as a next valid packet is received and the receiver entity notices one or more lost packets, the amount of lost packets can be indicated to the encoder entity together with the valid decoded packet. Then the encoder can be run again using the valid decoded packet. For this encoded outgoing packet, the gap due to packet loss in the incoming stream can be indicated for the peer decoder by incrementing the RTP timestamp according to the gap. In this way, the bad frame handler of the peer decoder can interpolate the missing packets and reasonable voice quality can be maintained.

The above-mentioned approach can be enhanced when a lookahead is used in the encoder stage. The voice quality can be improved when decoded received speech signal is aligned according to the lookahead before the encoder stage.

Furthermore, voice quality can be enhanced by running decoder/bad frame handler and encoder once after the first lost packet. This enhancement may diminish quality effects due to encoder-decoder synch loss of the first codec pair. Moreover, the result may be close to a quality level of the transcoding with conventional bad frame handling. This will limit the peak processing load twice to the nominal load, which should be acceptable for the most of applications.

Finally certain embodiments provide a way to handle possible clicks with the discontinuous transmission (DTX) function of adaptive multi-rate (AMR) and adaptive multi-rate wideband (AMR-WB) codecs by substituting speech data including clicks with appropriate data.

As mentioned above, currently a jitter buffer is applied to an incoming speech stream before the transcoding stage. A result of the jitter buffer is that it increases the latency of the connection.

The jitter buffer may be mandatory for packet to circuit switched (CS) network interworking, as it removes jitter in packet stream before sending voice signal to the CS network. For IP-to-IP interworking, however, it may not be necessary to remove jitter, as the receiving CS gateway or IP terminal can equalize the packet stream before speech decoding and voice sample play-out.

Certain embodiments in the present disclosure avoid latency by omitting the jitter buffering before the transcoding stage. Certain embodiments also prevent peak processing load and packet clustering in the outgoing stream for received lost packets by freezing decoder and encoder running for the time period when packets are not received.

Figure 1:
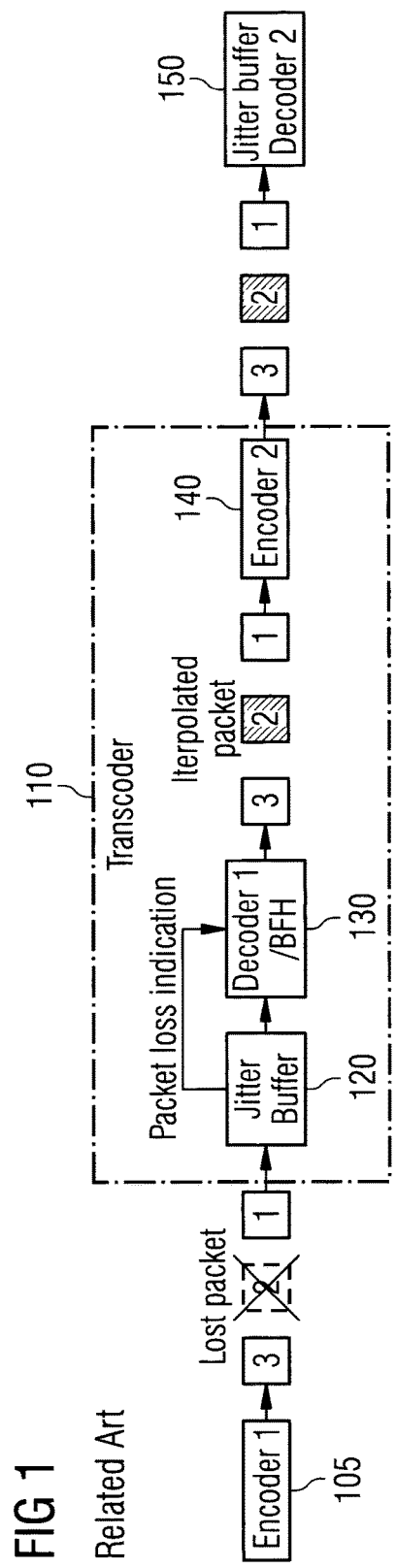
FIG. 1 illustrates a conventional transcoding with jitter buffering.

A first embodiment is shown in FIG. 3. In addition to the instant decoding without any jitter buffering, the bad frame handling stage within first decoder 130 can be omitted (contrary to the Related Art shown in FIGS. 1 and 2). Furthermore a packet loss indication block 125 informs the second encoder 140 about missing packets. In the case of one or more missing packets the first decoder 130 can be frozen such that no decoded voice packets are sent internally between first decoder 130 and second encoder 140. Also the running of second encoder 140 can be frozen during this period, such that no packets are sent towards the peer/second decoder 150.

As soon as the next valid packet has been received, it can be decoded, and along with this packet, the number of lost packets can be sent as a side-information to the second encoder 140. Now the second encoder 140 can be run again but the number of missing packets can be informed in this packet by incrementing the RTP time stamp by the amount of sampling clock ticks corresponding to the time of lost packets plus one packet. Additionally, the RTP sequence number may be incremented by the number of missing packets plus one. Alternatively, the RTP sequence number can be incremented by one. The jump in the timestamp can indicate to the peer jitter buffer/decoder/bad frame handler 150 that a certain amount of packets are missing and the decoder can be run with the bad frame handler multiple times in order to interpolate the missing voice packets. This can result in a constant decoded voice stream that could be played out to the CS network in case of the IP-to-CS gateway, or to D/A converter in the of case the IP terminal.

Benefits of the above-mentioned embodiment are that the latency due to conventional jitter buffering and a peak in the processing load can be avoided. Received packets are instantly forwarded to the loss indication and decoder blocks and then to the encoder block. Missing packets do not cause the generation of any packets between the first decoder 130 and second encoder 140 within the transcoder. This prevents a peak in the processing load once the next valid packet can be received after the lost packets, because the first decoder 130 and second encoder 140 are not run for the missing packets. Furthermore this prevents packet clustering of the conventional approach in which missing packets are interpolated within the transcoder before encoding, as illustrated in FIG. 2.

In a second embodiment, a loss of quality due to misalignment in the signal phase between received and sent packet streams can be compensated when the second encoder 140 uses a lookahead functionality. Lookahead can be used in the windowing of the linear prediction block of an encoder, and is used in many low-bitrate codecs, such AMR, AMR-WB and G.729.

A quality loss can arise when one or more successive packets are lost in the receiving packet stream. These lost packets can be reflected as missing packets in the outgoing packet stream with slightly different signal phase compared to incoming packets. Specifically, the signal phase can be delayed by the amount of lookahead, which is typically 5 ms. This phase difference can cause additional disturbances at the second decoder 150 output when a packet loss occurs. FIG. 5a illustrates this phenomenon for a triangle waveform of 50 Hz. In this example the most common packet size of 20 ms has been used which is also the typical codec frame size for low-bitrate speech codecs. At the initialization, the encoder adds 5 ms of zero signal before encoding the actual signal. This effectively increases delay by 5 ms at the second encoder 140 output.

Moreover a typical sub-frame size of 5 ms is utilized here for the internal decoded packet size/interval. This can be used by an MGW. Strictly speaking, G.711 encoded 5 ms packets can be used by the MGW, but these could be 5 ms packets having linear pulse code modulation (PCM) samples as well. When 5 ms internal packets are used, a 15 ms additional delay can be generated because the second encoder 140 cannot be run until the fourth sub-frame has been received. This can be due to timer based scheduling currently used by the MGW. This drawback could be enhanced, however, by sending internal packets as a cluster of four sub-frames.

A solution for the lookahead alignment problem is shown in FIGS. 4 and 5b. If the second encoder 140 is utilizing a lookahead, the first sub-frame from the first decoder 130 can be dropped at the initialization phase of the transcoder. Thus, the first outgoing encoded packet will be generated from sub-frames 2 to 5. This will delay the sending of the first encoded and following packets by 5 ms compared to the non-alignment case. However as seen from FIG. 5b, the actual signal may not be delayed compared to the non-alignment case, and the delay may not be increased from the end user point of view. If the second encoder 140 is not using the lookahead functionality, the dropping of the first sub-frame may not be applied.

In the case of 20 ms packets used internally by the transcoder, the second packet must be awaited from the first decoder 130 until sub-frames 2 to 5 can be given to the second encoder 140. This can generate a delay of 20 ms, which is actually equal to the previous case in which 5 ms internal packets are used. Thus, certain embodiments can be used both for 5 ms and 20 ms internal packet sizes having the same delay. When the second encoder 140 is not using the lookahead, the 20 ms additional delay can be avoided.

Figure 6:
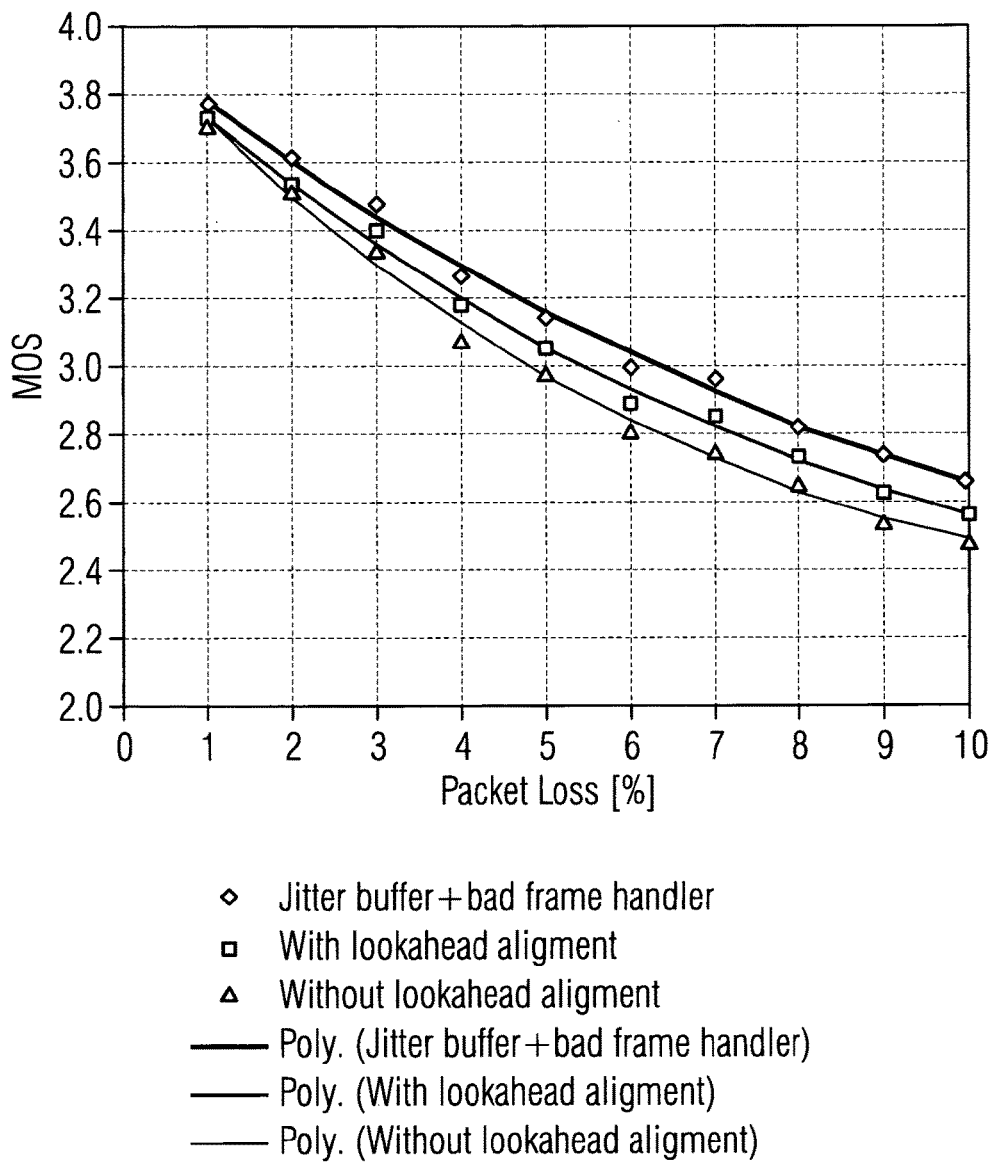
FIG. 6 illustrates MOS (P.862.1) for jitter buffer/bad frame handler, with and without lookahead alignment, according to certain embodiments.

A benefit of the lookahead alignment can be seen from FIG. 6. Simulations with ITU-T P.862.1 objective MOS tool and AMR12.2 kbps to AMR12.2 kbps transcoding scenario show an improvement of about 0.1 mean opinion score (MOS) compared to the scenario without lookahead alignment. However, it does not reach the quality level of the reference scenario, which is the conventional jitter buffering with bad frame handling. Accordingly, an enhancement to the first and second embodiments can be used, as described in a third embodiment.

In the third embodiment, voice quality of the reference scenario (jitter buffering and bad frame handling) is to be achieved. In the first and second embodiments disturbances appear after first decoder 130 if speech frames are dropped without any bad frame handling. This may be because synchronization is lost between the first encoder 105 and the first decoder 130.

Figure 7:
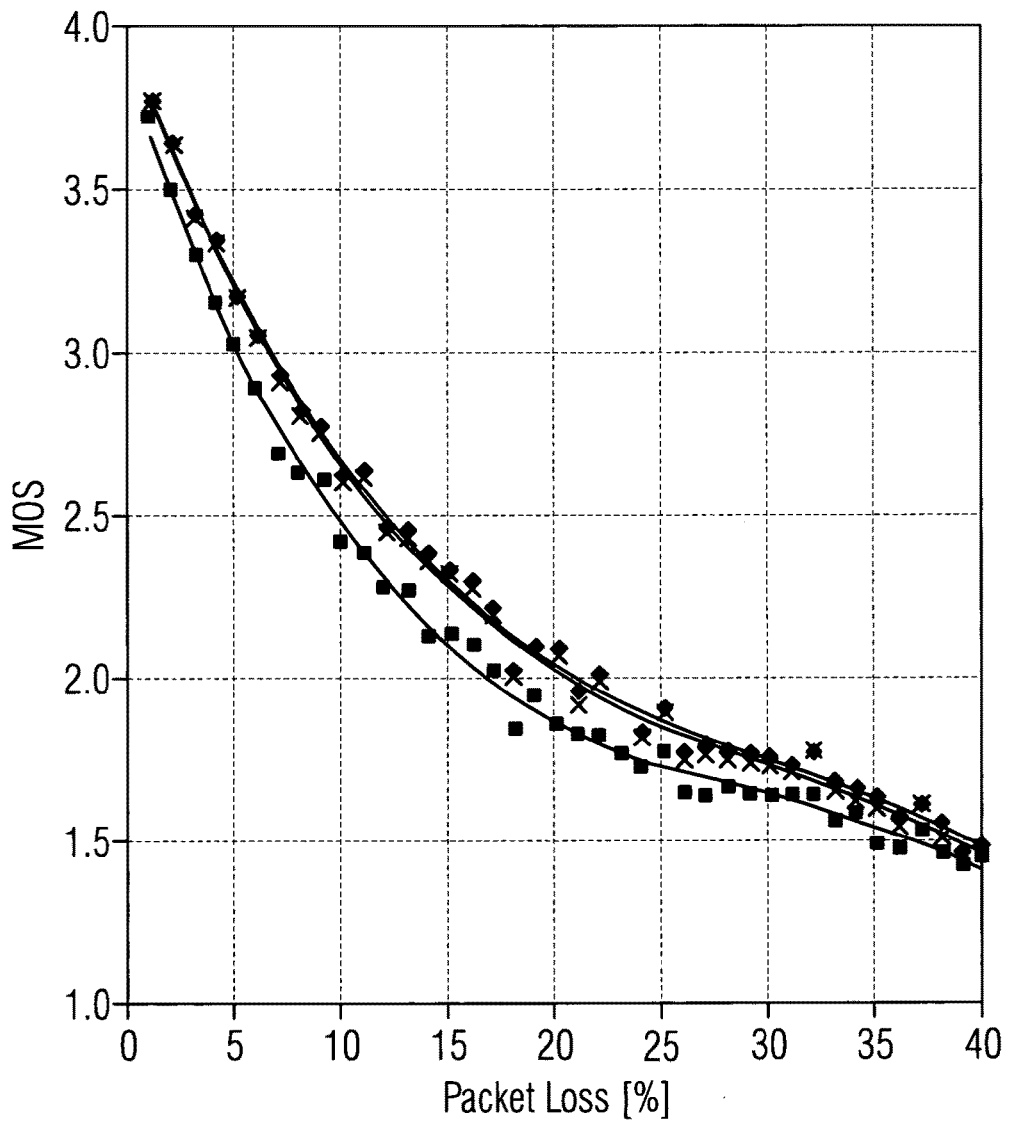
FIG. 7 illustrates MOS (P.862.1) for jitter buffer/bad frame handler, the second embodiment and a third embodiment.

There are some dependencies in successive encoded speech frames which may generate disturbances when encoded speech frames are just dropped. These disturbances can be diminished very effectively if the bad frame handler is run once for one lost packet. It can be enough to run the bad frame handler just once after the next valid packet, in practice, as can be seen from FIG. 7. This approach of running the bad frame handler just once per bad frame can limit the peak processing load to twice the nominal. As shown in FIG. 7, the performance of the third embodiment may be virtually the same as the reference scenario. Alternatively, the bad frame handler can be run once a certain time has passed since the last received packet. Thus, for packet losses of a longer period of time, the bad frame handler can also be run once after the last valid packet. For losses of more than one packet, the bad frame handler may be run twice or more times. This may further enhance voice quality.

Some limitation in processing load may also be necessary when, due to an excessive jitter, a cluster of packets is received from first encoder 105. Normally the jitter buffer can handle these kinds of occasions by equalizing reasonably clustered packets while excessively delayed packets are discarded. In a transcoder without jitter buffering, excessively clustered packets may induce a high peak load into the system. Here, a peak load limitation can solve this problem. In the peak load limitation, processing of clustered packets can be delayed or some packets can be dropped so that the desired load level is achieved.

Out-of-order packets can also be handled in a sensible manner by the present system. In order to minimize delay, a later packet, once received, can be decoded and sent towards the second encoder 140. This can lead to a situation in which a first packet must be discarded if it is received after a later packet. This can effectively increase the frame erasure ratio. For example, when two packets are received out of order and the latter sequence number packet is transcoded once received, the delay can be minimized because the first sequence number packet has not been awaited. The first sequence number packet is treated as an excessively delayed packet and is discarded. Out-of-order packets are very rare in real networks, so this kind of handling may have a small real impact.

Figure 8:
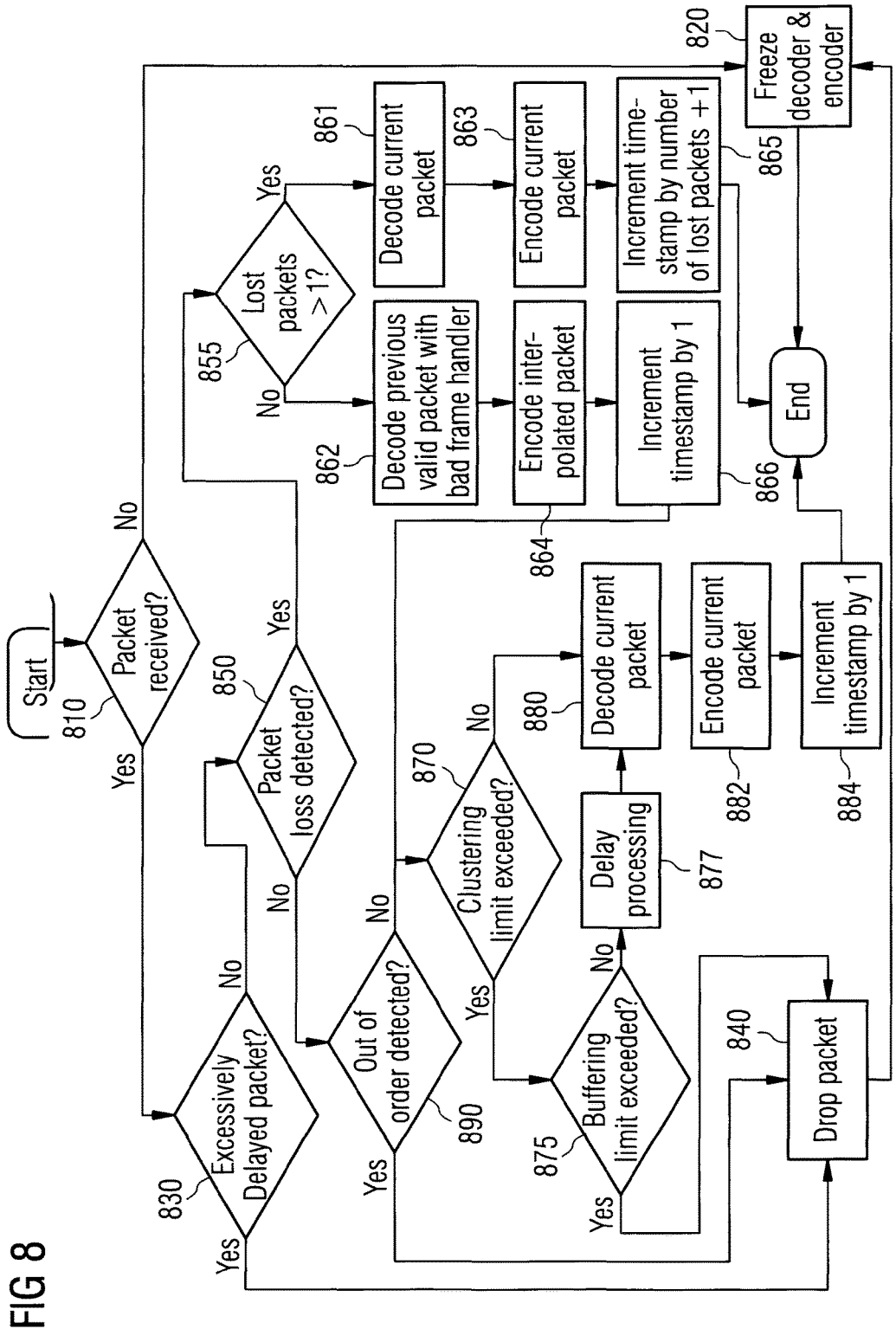
FIG. 8 illustrates a flow-chart for the third embodiment.

A flow chart for the third embodiment is shown in FIG. 8. The sequence shown in the flow chart can be run at an appropriate polling rate, which can be less than a packet interval. The first decision block 810 detects whether a packet has been received. If it has not been received, first decoder 130 and second encoder 140 are kept in frozen state at 820.

Once a packet has been received, it is analyzed whether a threshold of the excessive delay has been exceeded at 830. If the delay has been exceeded, the packet can be discarded at 840. This threshold may be useful to avoid generating an excessive jitter to the peer decoder, and this threshold may be analogous to a buffering level of a conventional jitter buffer. Late packets exceeding the buffering level can be discarded by the jitter buffer.

If the excessive delay has not been exceeded at 830, a possible loss of one or more packets can be detected at 850 by, for example, analyzing RTP sequence number and timestamp of the received packet. If there is a gap in both sequence number and timestamp compared to the previously received packet, a packet loss can be determined to be present. The number of packets that are missing can also be determined, at 855. In the case of loss of one packet, the previously received valid packet can be decoded at 862 with the bad frame handler and the decoded frame can be sent to the second encoder 140 over the internal interface. Then the interpolated packet can be encoded, at 864, by the second encoder 140, and the timestamp (and optionally the sequence number) of the outgoing encoded packet can be incremented by one at 866.

Note that one timestamp unit here can refer to an increment of RTP sampling clock ticks of packet interval. For example, 160 ticks for an 8000 Hz sample rate and a 20 ms packet interval. After the sending of the interpolated encoded packet, the processing load level of the transcoder can be analyzed with respect to packet clustering 870 and buffering 875. If both packet clustering and buffering limit levels are not exceeded, the current packet can be decoded at 880 and forwarded to the second encoder 140. The buffering limit can be a maximum number of buffered packets. Then the decoded packet is encoded at 882 and timestamp and sequence number are incremented by one for the outgoing packet at 884.

If the clustering limit is exceeded but buffering limit is not exceeded, the running of the first decoder 130 and second encoder 140 can be delayed at 877, such that the processing peak load is kept within an allowed limit. If the buffering limit is exceeded, the current packet is dropped. Alternatively one of the previously received packets could be dropped from the buffer.

If a loss of more than one packet has been detected, the current valid packet can be decoded at 861 and sent to the second encoder 140 together with an indication of the number of lost packets. The outgoing packet can be encoded at 863 and the timestamp can be incremented by the number of lost packets plus one at 865. This case may be equivalent to the first embodiment, discussed above.

In the case of a received packet but no detected packet loss, the correctness of the sequence number can be studied by verifying that the current sequence number is higher by one than the previously received, at 890. If this is true, the clustering and buffering limits can be analyzed as discussed above, via 870 and 875, if appropriate. If the received packet has been received out of order, it can be dropped at 840.

The third embodiment can also include the quality enhancement provided by the second embodiment.

The architecture of the first, second, and third embodiments may cause an audible click to transfer into the encoded audio after second encoder 140 when Discontinuous Transmission (DTX) is used and DTX hangover period frames are lost before first decoder 130. Specifically the audible click may be caused by the following.

Figure 9:
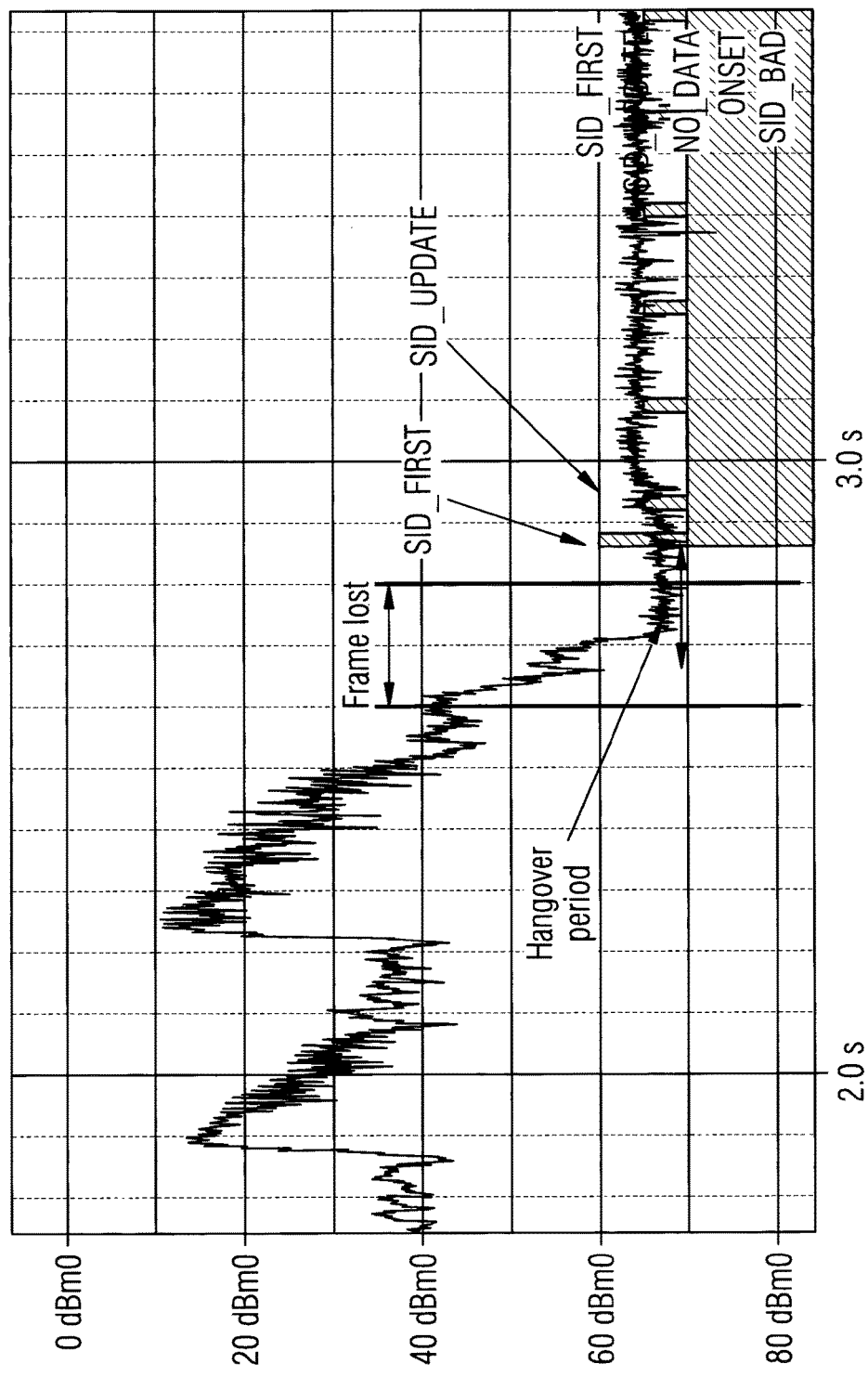
FIG. 9 illustrates a DTX problem of hangover period frames lost before SID frames.
Figure 10:
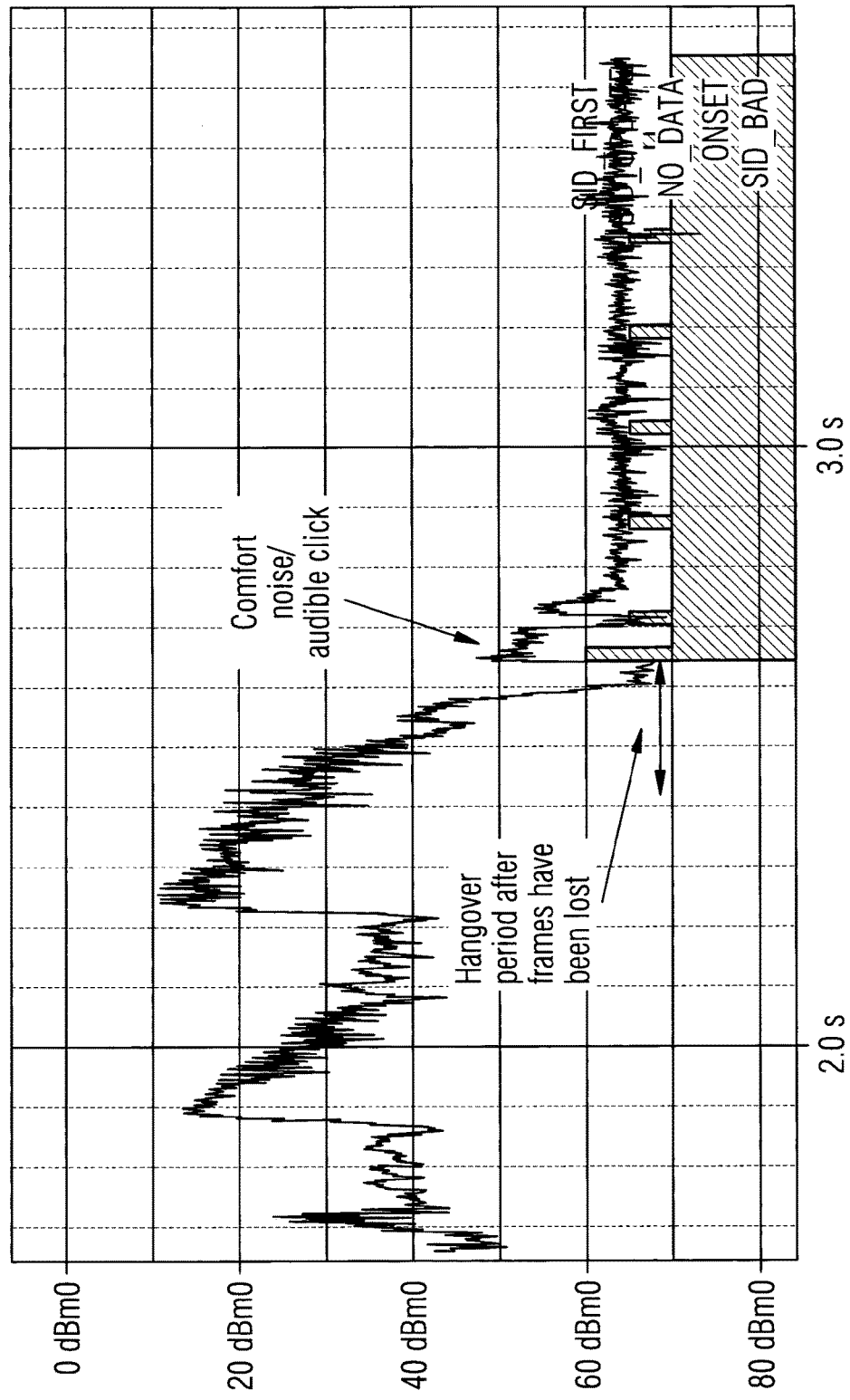
FIG. 10 illustrates a DTX problem of comfort noise with wrong hangover period frames.

In first decoder 130, the decoder can generate comfort noise when SID frames are received. For the first SID_FIRST/SID_UPDATE after speech frames, comfort noise can be generated based on hangover period speech frames, which can be, for example, 7 previous speech frames. If some of the hangover period frames are lost, then the comfort noise parameters can be calculated from frames that can contain high energy speech as illustrated in FIG. 9. The result of such calculation can be audible clicks in the decoded signal, as illustrated in FIG. 10.

Figure 11:
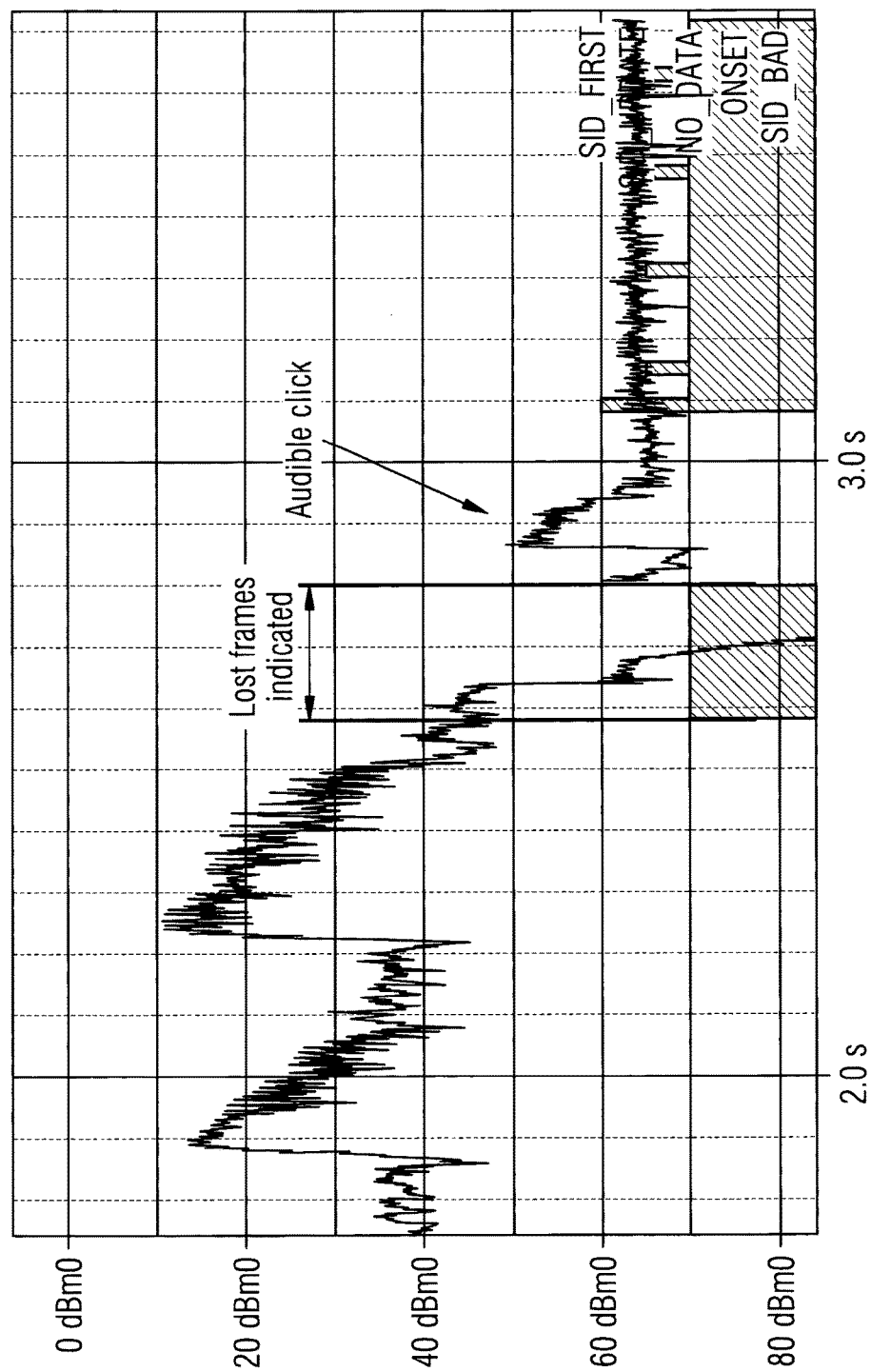
FIG. 11 illustrates a DTX problem of audible click heard by end user.

The audible click from first decoder 130 can be encoded by the second encoder 140. The jump in the timestamp can be indicated to the peer jitter buffer/decoder/bad frame handler 150 of the missing packets. Then, the audible click can be heard after second decoder 150 by the end user as illustrated in FIG. 11.

There are multiple ways to avoid this audible click, when missing frames from handover period have been detected.

According to a first example implementation, after first decoder 130, the system can set PCM samples to zero for the duration of SID_FIRST+first SID_UPDATE comfort noise period, after second SID_UPDATE has been received resume normal operation According to a second example implementation, first SID_FIRST & SID_UPDATE can be replaced with homing frames. After second SID_UPDATE has been received normal operation can be resumed.

According to a third example implementation, the "frames elapsed since the last SID frame" counter can be set to zero in first decoder 130, resulting in the previous SID update being used for comfort noise calculation. 3GPP technical specification (TS) 26.092, which is hereby incorporated herein by reference in its entirety, explains: "The decoder counts the number of frames elapsed since the last SID frame was updated and passed to the RSS by the encoder. Based on this count, the decoder determines whether or not there is a hangover period at the end of the speech burst. The interpolation factor is also adapted to the SID update rate. As soon as a SID frame is received comfort noise is generated at the decoder end. The first SID frame parameters are not received but computed from the parameters stored during the hangover period. If no hangover period is detected, the parameters from the previous SID update are used."

According to a fourth example implementation, frames can be buffered from previous hangover periods and the system can use those frames to generate comfort noise, thus avoiding the use of non-hangover period speech frames.

According to a fifth example implementation, the system can substitute the frames containing the audible click after first decoder 130 on second encoder 140 side with no_data frames.

According to a sixth example implementation, the system can model background noise level and spectrum from previous speech pauses and replace the frames containing the audible click after first decoder 130 with synthesized comfort noise.

Certain embodiments may have various advantages. For example, certain embodiments may avoid the latency issues found in conventional jitter buffering, as received packets may be instantly forwarded to the loss indication and decoder blocks and then to the encoder block. These embodiments may also prevent packet clustering, because the missing packets are not interpolated within the transcoder before encoding.

Embodiments of an apparatus can take various forms. For example, an apparatus, which may be a transcoder, can include a packet loss detector configured to receive a packet at the packet loss detector. The apparatus can be configured to omit jitter buffering before decoding and to omit bad frame handling in a decoding stage. The packet loss detector can be any suitable device, and may include one or more controller, processor, memory, or combination thereof. The packet loss detector can, for example, correspond to packet loss indication block 125.

The apparatus can also include a decoder configured to decode the packet into a decoded packet. The decoder can correspond to first decoder 130.

Further, the apparatus can include an encoder configured to encode the decoded packet into a re-encoded packet. The encoder can correspond to second encoder 140.

The apparatus can additionally include a transmitter configured to transmit the re-encoded packet from the transcoder. The transmitter can be variously embodied. For example, the transmitter can be a network interface card, a port, a wireless modem, or any other suitable communication hardware.

The packet loss detector can further be configured to monitor for a received packet and freeze the decoder and the encoder when a packet is not received, as illustrated at 810 and 820 in FIG. 8.

Further, the packet loss detector can be configured to determine whether a received packet is excessively delayed and drop the received packet when the received packet is excessively delayed, as illustrated at 830 and 840 in FIG. 8.

The packet loss detector can further be configured to determine whether a received packet is out of order and drop the received packet when the received packet is out of order, as illustrated at 890 and 840 in FIG. 8.

In addition, the packet loss detector can be configured to determine whether a clustering limit is exceeded, determine whether a buffering limit is exceeded when the clustering limit is exceeded, and delay processing a received packet when the buffering limit is not exceeded, as illustrated at 870, 875, and 877 in FIG. 8.

The packet loss detector can further be configured to determine whether a buffering limit is exceeded and drop a received packet when the buffering limit is exceeded, as illustrated at 875 and 840 in FIG. 8.

Further, the packet loss detector can be configured to determine whether only a single packet has been lost and interpolate an interpolated packet for the single packet when only the single packet has been lost, as illustrated at 855 and 864 in FIG. 8.

The packet loss detector can further be configured to signal an amount of lost packets to the encoder when a valid packet is received after at least one packet is lost or dropped, as illustrated in FIGS. 3 and 4.

Also, the packet loss detector can be configured to provide a lookahead at the encoder and align a received speech signal according to the lookahead before the received speech signal is provided to the encoder.

The packet loss detector can further be configured to determine that comfort noise is to be applied during a period of a lost packet and control the comfort noise to avoid an audible click. This can be accomplished using any of the six implementation examples described above, or by any other way.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

3G Third Generation
AMR Adaptive Multi-rate
AMR-WB Adaptive Multi-rate Wideband
AoIP A-interface over IP
CS Circuit Switched
D/A Digital to Analog
DTX Discontinuous Transmission
GSM Global system for mobile communication
IP Internet Protocol
LTE Long Term Evolution
MGW Media Gateway
MOS Mean Opinion Score
MRF Multimedia Resource Function
PCM Pulse Code Modulation
RTP Real Time Protocol, Real-time Transport Protocol
RSS Radio Sub-System
SID Silence Descriptor
VoIP Voice over Internet Protocol

We claim:

1. A method, comprising:
receiving a packet at a packet loss detector of a transcoder;
omitting jitter buffering before decoding in the transcoder and omitting bad frame handling in a decoding stage of the transcoder;
decoding the packet into a decoded packet;
encoding the decoded packet into a re-encoded packet;
transmitting the re-encoded packet from the transcoder;
monitoring for a received packet;
freezing a decoder and an encoder of the transcoder when a packet is not received;
sending packet loss information from the decoder to the encoder when a packet loss is detected; and
setting an outgoing packet stream to permit detection of missing packets by a downstream decoder upon receiving a valid packet after the packet is not received.

2. An apparatus, comprising:
a packet loss detector configured to receive a packet at the packet loss detector, wherein the apparatus is configured to omit jitter buffering before decoding and to omit bad frame handling in a decoding stage;
a decoder configured to decode the packet into a decoded packet;
an encoder configured to encode the decoded packet into a re-encoded packet; and
a transmitter configured to transmit the re-encoded packet from the transcoder,
wherein the packet loss detector is further configured to monitor for a received packet; and
freeze the decoder and the encoder when a packet is not received,
wherein the decoder is configured to send packet loss information to the encoder when a packet loss is detected, and
wherein the encoder is configured to set an outgoing packet stream to permit detection of missing packets by a downstream decoder upon receiving a valid packet after the packet is not received.

3. The apparatus of claim 2, wherein the packet loss detector is further configured to signal an amount of lost packets to the encoder when a valid packet is received after at least one packet is lost or dropped, and
wherein the encoder is configured to set the outgoing packet stream to permit detection of missing packets by a downstream decoder upon receiving a valid packet after packets are not received.

4. The apparatus of claim 2, wherein the decoder is configured to
set a timer when the packet is not received; and
perform bad frame handling on at least one packet when the timer expires.

5. The apparatus of claim 2, wherein the packet loss detector is further configured to perform bad frame handling on a plurality of packets up to a predetermined maximum number of packets.

6. The apparatus of claim 2, wherein the packet loss detector is further configured to
determine whether a received packet is out of order; and drop the received packet when the received packet is out of order.

7. The apparatus of claim 2, wherein the packet loss detector is further configured to
determine whether a clustering limit is exceeded;
determine whether a buffering limit is exceeded when the clustering limit is exceeded; and
delay processing a received packet when the buffering limit is not exceeded.

8. The apparatus of claim 2, wherein the packet loss detector is further configured to
determine whether a buffering limit is exceeded; and
drop a received packet when the buffering limit is exceeded.

9. The apparatus of claim 2, wherein the packet loss detector is further configured to
provide a lookahead at the encoder; and
align a received speech signal according to the lookahead before the received speech signal is provided to the encoder.

10. The apparatus of claim 2, wherein the packet loss detector is further configured to
determine that comfort noise is to be applied with comfort noise being generated from other frames than hangover period frames; and
control the comfort noise to avoid an audible click.

11. The apparatus of claim 10, wherein the packet loss detector is configured to control the comfort noise by at least one of:
setting PCM samples to zero for the duration of SID_FIRST+first SID_UPDATE comfort noise period, after second SID_UPDATE has been received resume normal operation;
replacing first SID_FIRST & SID_UPDATE with homing frames, after second SID_UPDATE has been received resume normal operation;
setting a frames elapsed since the last SID frame counter to zero in the decoder;
buffering frames from previous hangover periods and using the buffered frames to generate comfort noise;
substituting frames containing an audible click after the decoder with no_data frames at the encoder; or
modeling background noise level and spectrum from previous speech pauses and replacing frames containing the audible click after the decoder with synthesized comfort noise.

12. An apparatus, comprising:
receiving means for receiving a packet at a packet loss detector of a transcoder, wherein the apparatus is configured to omit jitter buffering before decoding and to omit bad frame handling in a decoding stage;
decoding means for decoding the packet into a decoded packet;
encoding means for encoding the decoded packet into a re-encoded packet; and
transmitting means for transmitting the re-encoded packet from the transcoder;
monitoring means for monitoring for a received packet;
freezing means for freezing a decoder and an encoder of the transcoder when a packet is not received;
sending means for sending packet loss information from the decoder to the encoder when a packet loss is detected; and
setting means for setting an outgoing packet stream to permit detection of missing packets by a downstream decoder upon receiving a valid packet after the packet is not received.

13. The apparatus of claim 12, further comprising:
signaling means for signaling an amount of lost packets to the encoder when a valid packet is received after at least one packet is lost or dropped; and
setting means for setting the outgoing packet stream to permit detection of missing packets by a downstream decoder upon receiving a valid packet after packets are not received.

14. The apparatus of claim 12, further comprising:
setting means for setting a timer when the packet is not received; and
bad frame handling means for performing bad frame handling on at least one packet when the timer expires.

15. The apparatus of claim 14, wherein the bad frame handling is performed on a plurality of packets up to a predetermined maximum number of packets.

16. The apparatus of claim 12, further comprising:
determining means for determining whether a received packet is out of order; and
dropping means for dropping the received packet when the received packet is out of order.

17. The apparatus of claim 12, further comprising:
determining means for determining whether a clustering limit is exceeded and for determining whether a buffering limit is exceeded when the clustering limit is exceeded; and
delaying means for delaying processing a received packet when the buffering limit is not exceeded.

18. The apparatus of claim 12, further comprising:
determining means for determining whether a buffering limit is exceeded; and
dropping means for dropping a received packet when the buffering limit is exceeded.

19. The apparatus of claim 12, further comprising:
providing means for providing a lookahead at the encoder; and
aligning means for aligning a received speech signal according to the lookahead before the received speech signal is provided to the encoder.

20. The apparatus of claim 12, further comprising:
determining means for determining that comfort noise is to be applied with comfort noise being generated from other frames than hangover period frames; and
controlling means for controlling the comfort noise to avoid an audible click.

* * * * *